(No Model.) 6 Sheets—Sheet 1.
O. H. ARNO.
MECHANICAL MUSICAL INSTRUMENT.

No. 361,201. Patented Apr. 12, 1887.

WITNESSES
Arthur P. Ford
Percy Bryant.

INVENTOR
Oliver H. Arno
per
Edwin W. Brown.
Attorney (No Model.) 6 Sheets—Sheet 3.

O. H. ARNO.
MECHANICAL MUSICAL INSTRUMENT.

No. 361,201. Patented Apr. 12, 1887.

WITNESSES
Arthur J. Ford.
Percy Bryant.

INVENTOR
Oliver H. Arno
per
Edwin W. Brown.
Attorney (No Model.) 6 Sheets—Sheet 4.

O. H. ARNO.
MECHANICAL MUSICAL INSTRUMENT.

No. 361,201. Patented Apr. 12, 1887.

WITNESSES
Arthur P. Ford.
Percy Bryant

INVENTOR
Oliver H. Arno
per
Edwin W. Brown.
Attorney (No Model.) 6 Sheets—Sheet 5.
O. H. ARNO.
MECHANICAL MUSICAL INSTRUMENT.
No. 361,201. Patented Apr. 12, 1887.
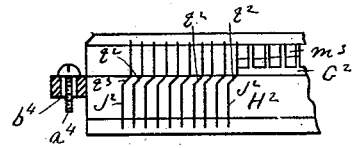
Fig. 9.
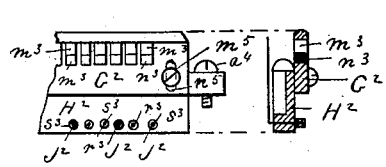
Fig. 10.
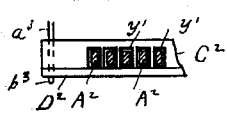
Fig. 11.
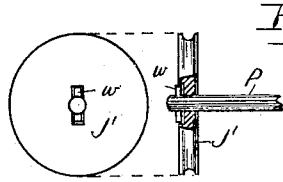
Fig. 12.
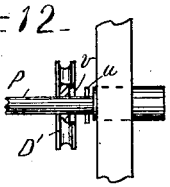
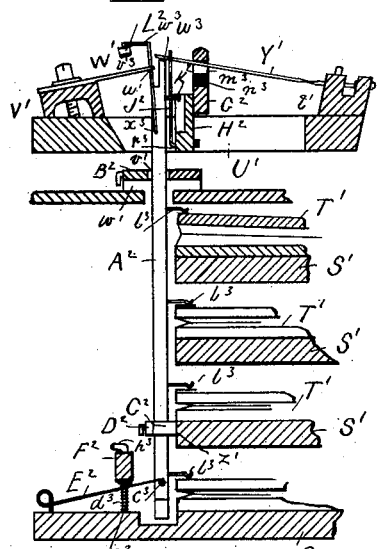
Fig. 5.
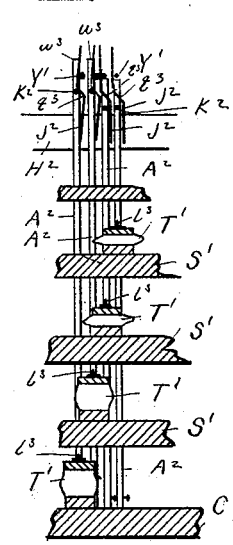
Fig. 6.
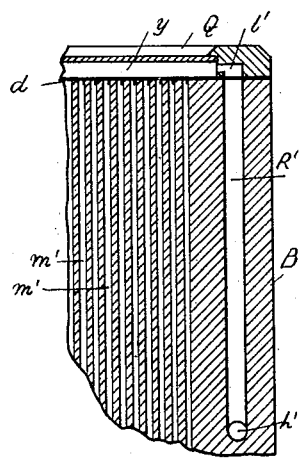
Fig. 7.
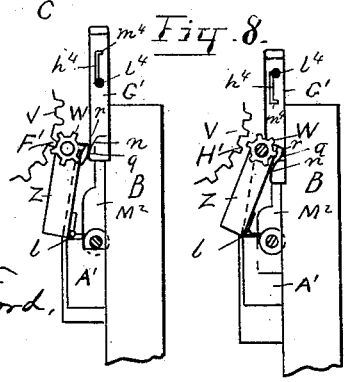
Fig. 13. Fig. 8.
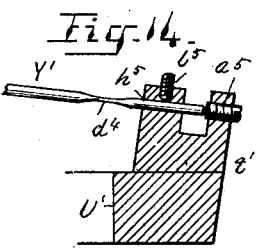
Fig. 14.
WITNESSES.
Arthur P. Ford.
Percy Bryant.
INVENTOR.
Oliver H. Arno
per
Edwin W. Brown.
Attorney (No Model.) 6 Sheets—Sheet 6.

O. H. ARNO.
MECHANICAL MUSICAL INSTRUMENT.

No. 361,201. Patented Apr. 12, 1887.

WITNESSES.
Percy Bryant.
C. E. Nichols.

INVENTOR.
Oliver H. Arno
per
Edwin W. Brown,
Attorney.

UNITED STATES PATENT OFFICE.

OLIVER H. ARNO, OF BOSTON, MASSACHUSETTS, ASSIGNOR TO THE ARNO MUSICAL BOX COMPANY, OF SAME PLACE.

MECHANICAL MUSICAL INSTRUMENT.

SPECIFICATION forming part of Letters Patent No. 361,201, dated April 12, 1887.

Application filed November 26, 1886. Serial No. 219,938. (No model.)

*To all whom it may concern:*

Be it known that I, OLIVER H. ARNO, of Boston, in the county of Suffolk and State of Massachusetts, have invented certain new and useful Improvements in Mechanical Musical Instruments, of which the following is a full, clear, and exact description.

This invention relates to improvements in the mechanical musical instrument described and shown in a pending application of mine in the United States Patent Office, Serial No. 199,732; and the invention consists in a mechanical musical instrument in which the sounding devices consist of tongues or teeth suitably constructed and arranged to vibrate, and of certain construction and arrangement of parts for operation on said tongues to cause them to vibrate and thus sound them, all substantially as hereinafter fully described.

In the accompanying sheets of drawings is illustrated a mechanical musical instrument constructed and arranged for operation substantially in accordance with the invention described in said application and having the present improvements applied thereto.

Figure 1:
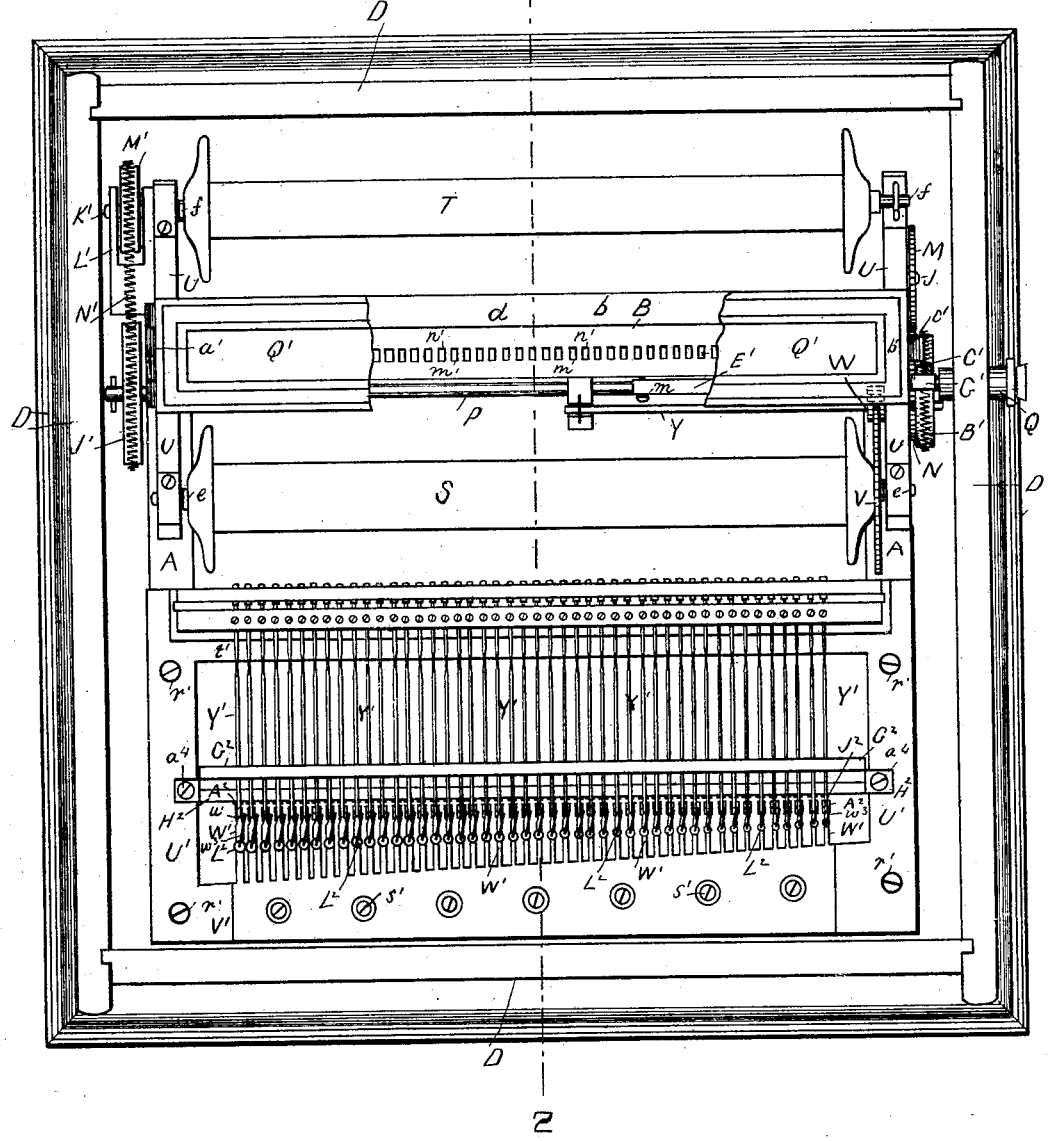
Figure 2:
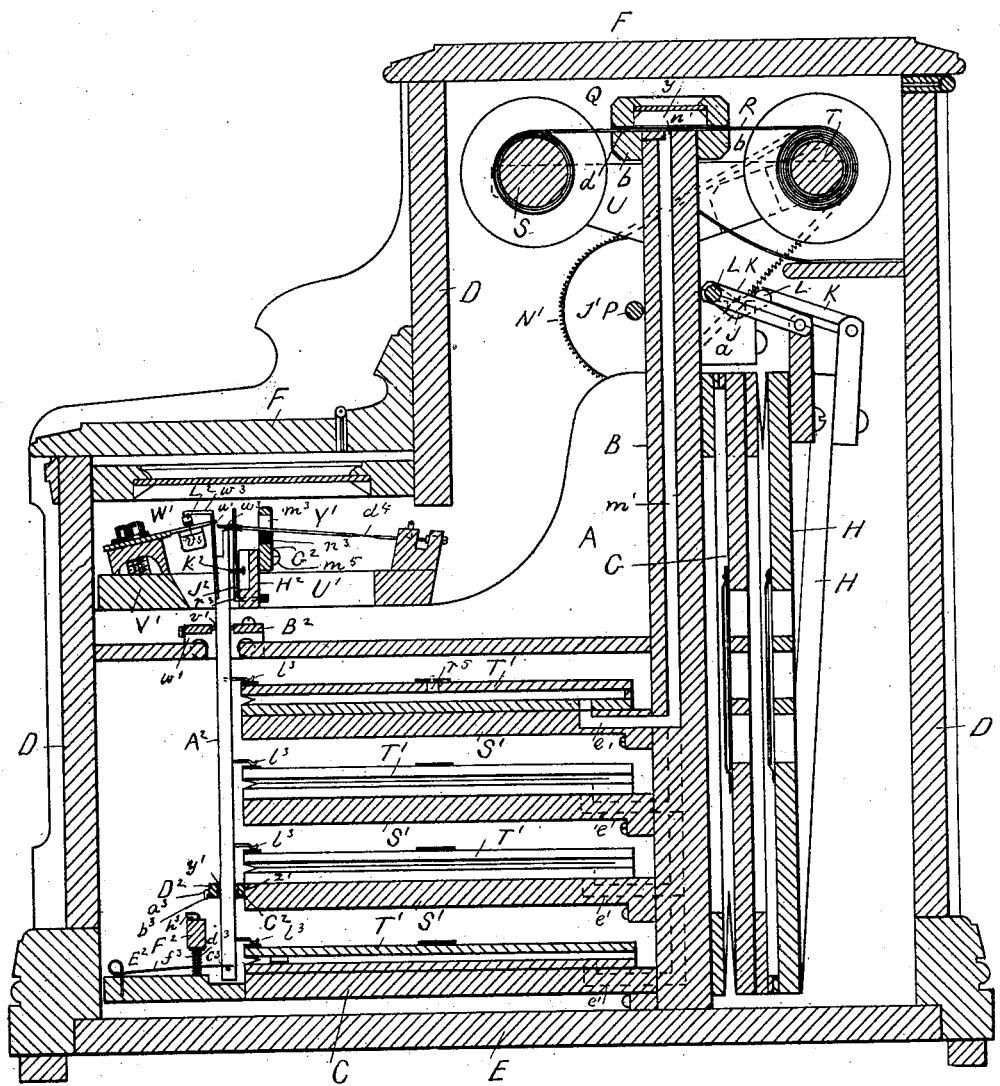
Figure 3:
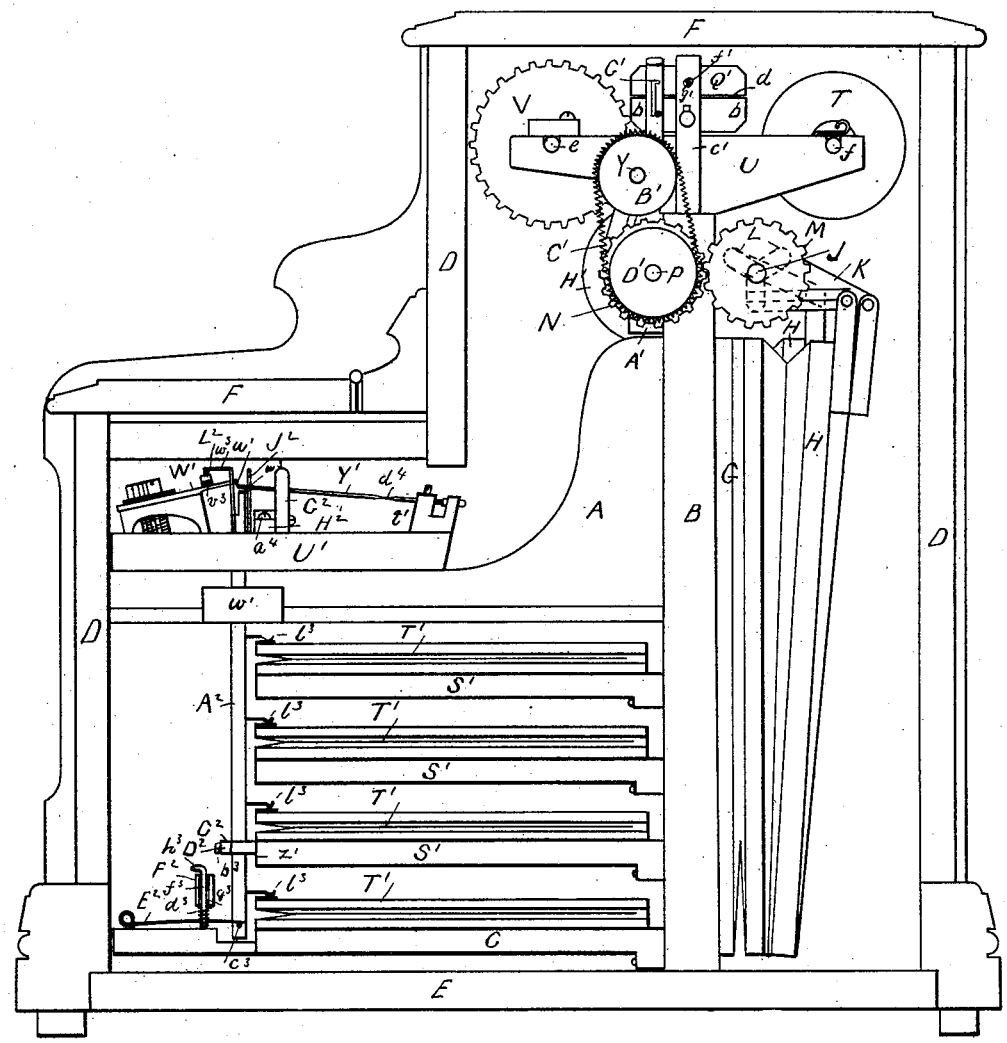
Figure 4:
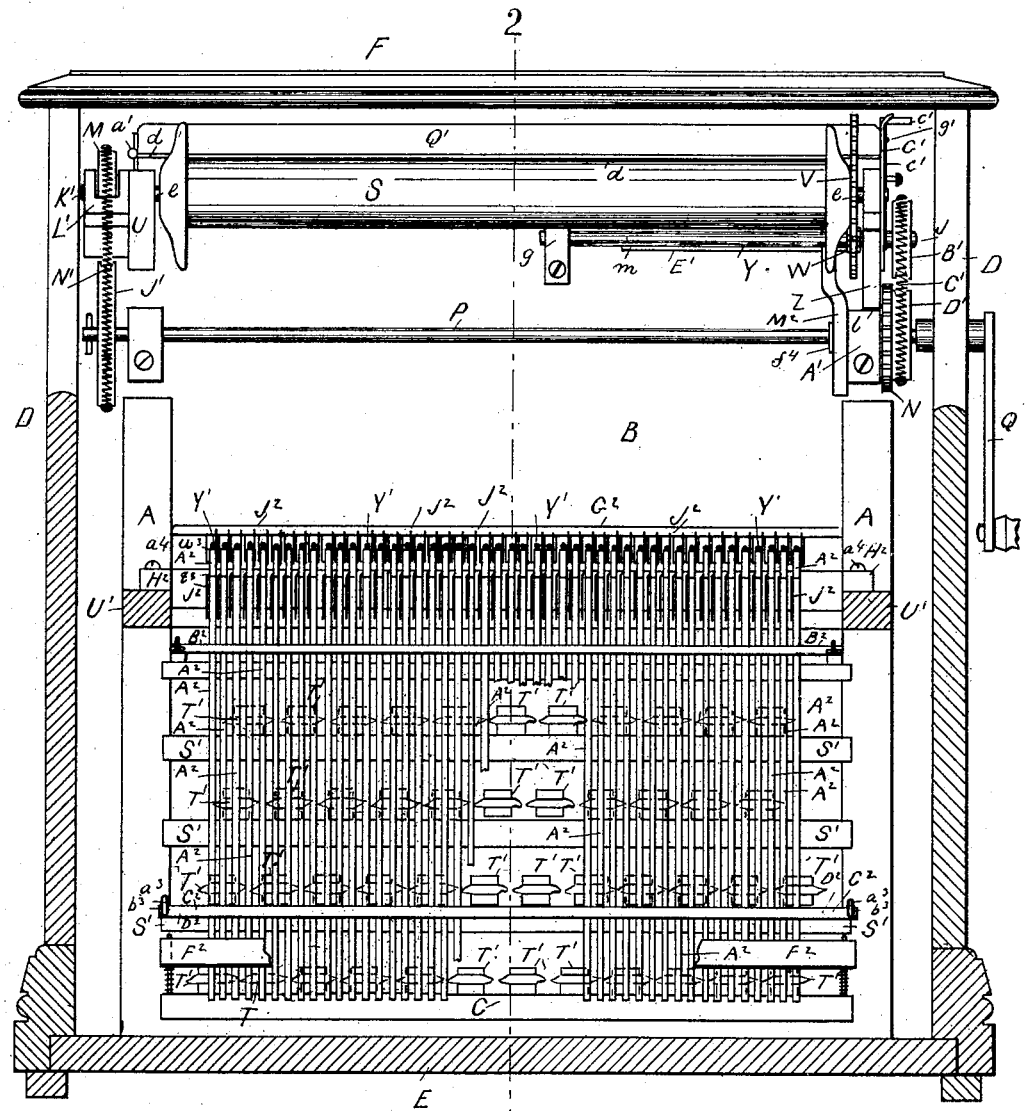

Figure 1 is a plan view of the instrument in a box or casing with the top or covers removed. Fig. 2 is a central vertical section from front to rear on line 2 2, Fig. 1. Fig. 3 is a side view of the working parts. Fig. 4 is a back elevation of the working parts with a portion broken away. Fig. 5 is a detail section similar to Fig. 2, but showing some of the parts in different positions; Figs. 6, 7, 8, 9, 10, 11, 12, 13, 14, 15, 16, 17, 18, and 19, detail views of some of the parts, to be hereinafter referred to.

In the drawings, A A represent two side uprights, connected together by a vertical cross-board B and bottom board, C, to which the various parts of the instrument are secured and supported, the whole being arranged to fit and be suitably secured within a box or casing, D, having a bottom, E, and top or covers F, the back portion of the casing being higher than the front portion, as shown.

G is an upright bellows secured to the back side of the vertical board B and having feeders H H, suitably arranged and adapted to be operated from a horizontal shaft, J, turning in suitable bearings in blocks $a$, secured to the board B and connected by pitman-rods K to crank-arms L of said shaft. This shaft has a gear-wheel, M, which engages with another gear-wheel, N, of same diameter on another shaft, P, parallel to the shaft J, which shaft P is adapted to receive a crank-handle, Q, through the casing D, by which it is turned, which turns the shaft J and operates the bellows and instrument, all substantially as is usual in mechanical musical instruments, and needing no more particular description herein.

The vertical board B at its upper edge is widened by side pieces or strips, $b$, secured thereto in any suitable manner, the whole upper surface, $d$, forming a raceway, over which travels the perforated music-sheet R.

S is the take-up roll, and T the music-roll, and they are both arranged to turn or rotate by their respective journals $e$ $f$ in suitable bearings in cross-arms U, secured to the board B.

Secured to the take-up roll is a gear-wheel, V, which engages with a pinion or small gear-wheel, W, on the end of short shaft Y, parallel to said roll and arranged to turn in a suitable bearing, $g$, on the board B, and a bearing on the upper end of a bar or block, Z, hinged at $l$ to a block, A', of the board B. On the outer end of this shaft Y, outside of the board B, is a pulley, B', which is connected by a spiral spring-wire belt, C', with a pulley, D', loose on the driving-shaft P, but adapted to be secured thereto when desired, by which belt-and-gear connection the take-up roll can be turned from the shaft P. The tension of the spiral spring-belt C' acts to pull the hinged block Z, with its gear-wheel W, toward the pulley D', thereby disengaging the pinion gear-wheel W from the gear-wheel V on the take-up roll.

E' is a lever pivoted at $m$ to the board and terminating just back of the block Z, having an upwardly-extending arm, G', its end being in position for convenient operation of the same at the top of the board B. This lever E' has an inclined edge, $n$, which, when the lever is in its highest position, abuts against a reversely-inclined edge, $q$, of the block $r$ on the upper end of the hinged block Z, so that when in such position it will hold the block Z forward, and thus its gear-wheel W engaged with the gear-wheel V on the take-up roll, as shown more particularly in Fig. 8 at F', and when the lever is pushed down its inclined edge $n$ passes below the inclined edge $q$ of the swinging-block Z, which allows the block from the tension of its belt C' to move back and disengage its gear-wheel W from the take-up roll gear-wheel V, as shown more particularly in Fig. 8 at H'.

On the other end of the driving-shaft P, outside of the cross-arm U, is a pulley, J', and on a short shaft, K', having its bearing in the cross-arm U and a block, L', its central axial line in line with the central axial line of the music-roll shaft, to which it can be connected for operation thereof and disconnected therefrom, is another pulley, M', which are connected together for operation by a spiral spring-wire belt, N'.

Figure 15:
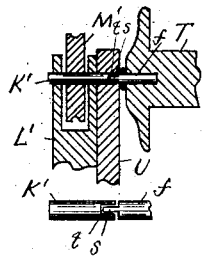

In Fig. 15, in detail section, is shown the manner of connecting the music-roll journal $f$ with the shaft K', the journal $f$ having a flat tongue, $s$, adapted to fit within a corresponding groove, $t$, in the end of the shaft K'. The object of these pulleys and shaft-connection is for the purpose of rewinding upon the music-roll the music-sheet after it has been wound upon the take-up roll in the operation of the instrument, to replace it with another music roll and sheet or to play the tune over again, and it is accomplished as follows: Press down the lever E' and disengage the two gear-wheels V W, as described, and then move the driving-shaft P longitudinally to the right, which disengages the cross-pin $u$ from its socket $v$ in the pulley D', engages another cross-pin, $w$, on the other end of the shaft P with the pulley J', so that as the shaft P is turned the music-roll will be turned and wind upon it the music-sheet, the take-up roll being free to turn in the right direction to unwind the music-sheet therefrom, because of the disengagment of the shaft P with the pulley D'. When the music-sheet is wound upon the music-roll, the gear-wheels V W are engaged with each other and the shaft P moved to engage with the pulley D' and disengage with the pulley J', so that, then turning the shaft P, the take-up roll will be turned in the proper direction for the proper operation of the take-up roll.

Above the raceway $d$, and extending over the same, is a cap-plate, Q', having a longitudinal chamber, $y$, in its lower side, and hinged by one end, $a'$, to the raceway, and, when down in position, it is secured at its end $b'$ by a flat vertical spring, $c'$, secured at $d'$ and having a socket, $f'$, which is arranged to pass over a longitudinally-projecting pin, $g'$, in the end of the cap. The music-sheet travels between the raceway and this cap, which holds the sheet closely upon the raceway, and, when desirous of removing or inserting the music-sheet, the cap is unfastened and turned up.

In the board B, at or near each side edge, is a vertical passage, R', having communication with the bellows-chamber by a horizontal passage, $h'$, which passage R opens to the surface at the end of the raceway, and, when the cap is down, communicating with a passage, $l'$, in the end of the cap, which passage opens into the chamber $y$ in the cap above the music-sheet.

On the upper side of each horizontal board C and S' of the uprights A is secured a series of small or pneumatic bellows, T'. Each of these pneumatic bellows has communication by a separate passage, $e'$, with a separate vertical passage, $m'$, in the vertical board B, which passages are all in the same vertical plane and open at the raceway in a line, as shown in detail in Fig. 7 in cross-section and in plan in Fig. 1. The upper ends of these passages at the raceway are reduced in area in cross-section, as shown at $n'$ in Fig. 2.

U' is a horizontal rectangular frame, preferably of metal, and secured to the top edges of the front portion of the side uprights by screws $r'$. On the upper side of the front bar, V', of this frame U' is secured by screws $s'$ a comb or plate of steel tongues or teeth, W', which are the sounding devices, and are such as are commonly used in "music-boxes," so called.

Y' are spring-wire pickers, each secured at one end to the back bar, $t'$, of the metal frame, and so that the free end of each will project toward a tongue, W', one picker to each tongue, and be just under the free end $u'$ of its respective tongue for it, when pressed upward, to strike or abut against and snap the end of its tongue, causing it to vibrate, and thus sound.

$A^2$ is a series of vertical bars or rods arranged in a line in front of the horizontal partitions C S' and the pneumatic bellows T' and below the operating ends of the pickers, one to each picker, and each arranged to move up and down in guideways—one a slot, $v'$, in a cross bar or rail, $B^2$, secured at each end to a block, $w'$, on the uprights A, and the other a slot, $y'$, in a lower rail, $C^2$, secured to the edge $z'$ of the lower board, S'. The slots $y'$ in the rail $C^2$ are open at the front side and have a strip or bar, $D^2$, over them to close the same, and secured at each end by a pin, $a^3$, having a bent portion, $b^3$, and secured in the rail $B^2$, the strip $D^2$ having an open slot at each end, which passes over the bent portion $b^3$ of the pin $a^3$ when it is turned for such portion to be in line with said slot, and when turned across said slot to hold the strip $D^2$ securely in place.

$E^2$ is a spring secured by one end to the bottom board, C, its free end resting and bearing upon a cross-pin, $c^3$, in the lower end of a rod, $A^2$, to hold, by its tension, the rod down in its proper position.

$F^2$ is a rail extending across and over the springs $E^2$, and resting at each end upon a spiral spring, $d^3$, encircling a pin, $f^3$, secured in the bottom board, C, and projecting through longitudinal slots $g^3$ in the rail $F^2$, through which the bent heads $h^3$ of the pins can freely pass when turned in line therewith when desirous of removing the rail and when turned across the rail to there hold it against the springs. This rail can be regulated as to its height by turning in or out the pins.

Each rod $A^2$ has a pin or arm, $l^3$, projecting horizontally therefrom, or substantially so, toward and a little way over and in proper position on the rod to bear or rest upon the upper side at the front end of a pneumatic bellows, T', one rod to each bellows, the bellows being arranged on their respective boards in such manner that each bellows will have its rod rest thereon in regular order—as shown, for instance, in Fig. 4 more particularly, where the first rod $A^2$ at the left has its projecting arm $l^3$ rest and bear upon the first bellows T' in the lowest row or tier of bellows, the second rod by its arm on the first bellows in the second row or tier, the third rod by its arm on the first bellows in the third row or tier, and the fourth rod by its arm on the first bellows in the fourth or upper row or tier, and the fifth rod by its arm with the first bellows in the first row or tier, and so on with the whole series of rods and bellows, the rods being in regular order or distances apart in one line, and each opposite to the central longitudinal line of its respective bellows.

Each picker passes through and is disposed within a vertical slot, $m^3$, in a cross bar or rail, $G^2$, secured to another cross bar or rail, $H^2$, which is secured to the frame U' at each end. The lower side of each slot $m^3$ is covered with felt, $n^3$, or any suitable soft material, on which its picker rests when in its normal position, all being in a uniform line and holding the pickers in proper place under their tongues.

$J^2$ is a wire having a right-angular portion, $r^3$, disposed in a socket in the rail $H^2$, the wire extending upward back of each push-rod and at one side of and above its respective picker Y', and having an intermediate angular portion, $t^3$, as shown more particularly in Figs. 6 and 9, for a projecting pin, $K^2$, on the push rod $A^2$ as it rises to abut against and move said wire to one side or to the right, and move its picker to one side and off the top end, $w^3$, of the push-rod after the picker has snapped and sounded its respective tongue.

In the operation of the instrument, turning the shaft P operates the bellows, and, with a music-sheet properly attached, causes it to travel across the raceway, and, as a perforation in said sheet comes over an air duct or passage, $m'$, in the board B, air from the bellows passes to the chamber $y$ in the cap through the perforation, and down such passage to its respective pneumatic bellows, opening it by raising its upper board, which raises its push-rod, which in turn raises its picker and causes it to strike and snap its respective tongue, which vibrates and sounds, when the picker from the cam-wire $J^2$, being pushed to one side by the push-rod pin $K^2$, as described, moves the picker to one side and off the end of the push-rod, which then, by its spring-power, moves down at the side of the push-rod, and when the push-rod returns to its normal position from the closing of its pneumatic bellows, because the perforation in the music-sheet has passed by and the unperforated portion of the music-sheet has come over the air duct or passage, preventing air entering it to pass to its pneumatic bellows, the picker returns to its normal position over and above the upper end of the push-rod, ready for another operation of it upon its tongue, all of which is substantially as shown in said application, except so far as relates to the present improvements.

$L^2$ is a block of wood, having a piece of felt, $v^3$, or other soft and suitable material, on its under side, the block being attached to a wire, which is bent, as shown at $w^3$, and is secured by its end $x^3$ firmly in the push-rod. The wire is bent so that its block by its felt when the push-rod is down in its normal position rests upon a tongue, W', and the one that is operated by the picker operated by the push-rod to which it is secured, and serves as a damper to the tongue, to cause its vibrations to cease after it has been sounded and the push-rod has returned to its normal position. The rail to which the cam-wires are secured is attached at each end by screws $a^4$ to the frame U, the holes or slots $b^4$ through which the screws pass being somewhat larger in diameter than the screws, whereby the rail can be adjusted in a horizontal plane, as desired, for a lateral regulation of the cam-wires.

The picker is made of spring metal, so that it can return to its normal position itself; and, in order to make it more flexible and yielding in its movements, it is drawn down or reduced in diameter, in any suitable manner, in a portion of its length, as shown at $d^4$, more particularly, in Fig. 14, which is a detail side view of the picker enlarged.

$M^2$ is an arm attached to the lever E' E', extending down in front of the board B, side of and projecting under the shaft, as at $e^4$, Fig. 13, so that as the lever is raised to engage the gear-wheels V W with each other this block $e^4$ will be moved up and be disposed about said shaft and between the block A' on said board and a flange, $g^4$, on the driving-shaft P, preventing, in the operation of the instrument, the accidental longitudinal movement of the shaft, and thus disengage said gear-wheels and interfere with a proper working of the instrument.

In the arm G' is a longitudinal slot, $h^4$, through which projects a pin, $l^4$, secured to the board, the slot having at each end a right-angular extension, $m^4$, by which the arm can be locked when in its highest and lowest position by the engagement of such angular portion with the pin, as shown in Fig. 8. Having the passage $m'$ of larger area in cross-section than its opening $n'$ facilitates the passage of the air therethrough to its pneumatic bellows. Arranging the pneumatic bellows in tiers or rows one above the other, as described and shown, enables the air-ducts and the push-rods and other operating parts in connection therewith to be placed closer in line and more compact, so that the instrument can be made more compact and smaller.

Figure 16:
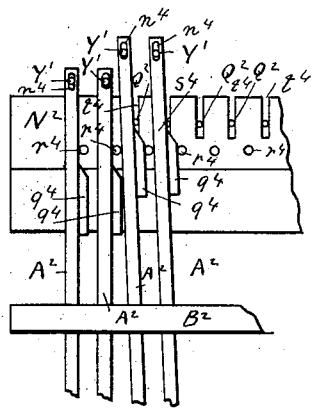
Figure 17:
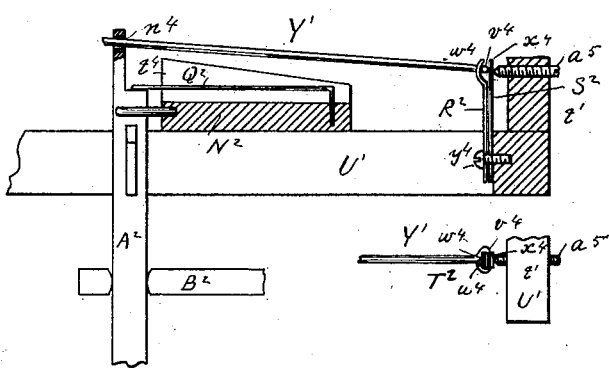

In Figs. 16 and 17 is shown a modification of operating the picker by the push-rod, Fig.

16 being a detail front view, and Fig. 17 a detail side elevation and partial section, with a detail plan view shown at $T^2$. The free end of the picker passes through and is within a socket, $n^4$, of the push-rod, projecting beyond it sufficiently for its end to operate on the tongue, and the push-rod is free to move at its upper end sidewise in the guideway $B^2$, and on one side is a projection or block, $q^4$, its upper end being beveled, as shown, the parts operating as follows: As the push-rod is moved up it carries with it the picker, and after the picker has snapped its tongue its projection $q^4$ strikes against a pin, $r^4$, of the bar $N^2$, moving the push-rod one side with its picker, as shown at $s^4$ in Fig. 16, and when the pneumatic bellows closes it falls, moving back to its normal position from the action of its spring $E^2$, as well as the spring of its picker. The push-rod has a shoulder on which bears the free end of the spring $Q^2$, secured by its other end in the bar $N^2$ in a groove, $t^4$. As the push-rod moves up and to one side, it passes from under the spring $Q^2$, which is prevented from moving sidewise by its groove $t^4$, and passes by the spring, and when the push-rod falls the spring $Q^2$ tends to return it laterally to its normal position. The picker at its secured end, as shown in Fig. 17, is bent round to form or make a flat eye, $u^4$, for the portion $v^4$ of it to lie between the free ends $w^4$ and $x^4$ of two vertical flat springs, $R^2 S^2$, secured by a screw, $y^4$, at their other ends to the rail $t'$, the free end of the spring $S^2$ bearing against the end of the regulating-screw $a^5$, by which the picker is held in its desired position longitudinally and also laterally, and to act to return the free end to its normal position after operation on the tongue, whether it is connected to the push-rod, as shown in said figure, or not.

Figure 18:
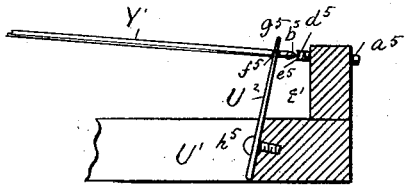
Figure 19:
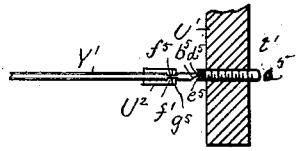

In Figs. 18 and 19 is shown another way of securing the picker to its rail or support. The end of the picker is beveled or cut off in an inclined or angular direction, as at $b^5$, on one side, the end $d^5$ resting in a socket, $e^5$, in the regulating screw $a^5$, and near the end on each side is a slot or groove, $f^5$, in which rests or bears against the ends nearest the end $d^5$ of the picker the forked end $g^5$ of a spring, $U^2$, secured to the rail by a screw, $h^5$, its tension holding the picker in its socket $e^5$, and by reason of the side bevel the spring acts to bring the free end of the picker back to its normal position after it has been operated upon by the push-rod, the bevel being on the side of the picker opposite to the direction its free end is moved by the cam-wire or push-rod.

In Fig. 14, in detail section, is shown how the picker is secured in the other views. The end of the picker passes freely through a socket in the portion $h^5$ of the rail $t'$ and abuts against the end of the regulating-screw $a^5$, the screwing in or out of which regulates the distance the picker projects under the tongue, and when properly adjusted it is secured from movement by a set-screw, $l^5$.

The rail $G^2$ is secured to the bar $H^2$ (see Fig. 10) by the screws $m^5$, which pass through transverse slots $n^5$, by which the rail $G^2$ can be regulated as to its height, and thus regulate the height of the pickers.

Each pneumatic bellows has its usual opening, $r^5$, for the escape of air, when desired, in its operation, and a more or less number of tiers or rows of pneumatic bellows can be used, as desired.

Having thus described my invention, what I claim is—

1. A picker for sounding a vibrating tongue, made of spring wire or metal and having a portion along its length reduced in diameter, for the purpose specified.

2. The combination, with a pneumatic bellows, of a push-rod arranged to move in suitable guideways for operation on a picker to vibrate a tongue, and having a projecting arm which rests or bears on said bellows, for the purpose specified.

3. The combination, with a push-rod arranged for operation on a picker to vibrate a tongue, of a damper or block secured to said rod and adapted to rest upon said tongue, for the purpose specified.

4. The combination, with a push-rod provided with a spring, $E^2$, for operation on a picker to vibrate a tongue, of a damper or block, $L^2$, secured to said rod and adapted to rest upon said tongue, for the purpose specified.

5. The combination, with a picker for operation on a vibrating tongue, of a cam-wire, $J^2$, for operation on said picker, substantially as described, supported on an adjustable rail.

6. The combination, with a series of pickers suitably arranged to operate upon a series of vibrating tongues, of a rail or bar provided with slots, one for each picker, the pickers resting upon said rail and the rail arranged to be adjusted, for the purpose specified.

7. An air duct or passage, $m'$, leading from a raceway over which a perforated music-sheet is arranged to travel to a pneumatic bellows having its opening at said raceway of reduced area in cross-section, for the purpose specified.

8. The combination, with a push-rod adapted to be operated by suitable mechanism against a picker for sounding a vibrating tongue provided with a projection for abutment against a shoulder or pin, of a picker secured at one end and having its free end engaging with said rod, for the purpose specified.

9. The combination, with a push-rod, $A^2$, adapted to be operated by suitable mechanism, of a picker for sounding a vibrating tongue, said push-rod having a socket, $n^4$, in which is disposed the free end of the picker, for the purpose specified.

In testimony whereof I have hereunto set my hand in the presence of two subscribing witnesses.

OLIVER H. ARNO.

Witnesses:
EDWIN W. BROWN,
PERCY BRYANT.